US008676366B2

(12) United States Patent
Ganci

(10) Patent No.: US 8,676,366 B2
(45) Date of Patent: Mar. 18, 2014

(54) SYSTEM AND A METHOD OF FABRICATING PROTECTIVE MASKS FOR VEHICLES

(76) Inventor: Eric Ganci, Geneva (CH)

( * ) Notice: Subject to any disclaimer, the term of this patent is extended or adjusted under 35 U.S.C. 154(b) by 378 days.

(21) Appl. No.: 13/032,988

(22) Filed: Feb. 23, 2011

(65) Prior Publication Data

US 2011/0213481 A1 Sep. 1, 2011

(30) Foreign Application Priority Data

Feb. 26, 2010 (FR) ..................................... 10 00795

(51) Int. Cl.
*G06F 19/00* (2011.01)

(52) U.S. Cl.
USPC ................................ 700/98; 428/58; 313/582

(58) Field of Classification Search
USPC ................................ 700/98; 428/58; 313/582
See application file for complete search history.

(56) References Cited

U.S. PATENT DOCUMENTS

2003/0167099 A1* 9/2003 Kesavadas et al. ........... 700/119
2004/0086679 A1* 5/2004 Ganci ............................ 428/58
2005/0154481 A1* 7/2005 Berger et al. .................. 700/98
2006/0112801 A1* 6/2006 Ganci .............................. 83/39
2006/0218051 A1* 9/2006 Westberg ........................ 705/26
2007/0293972 A1* 12/2007 Roth et al. .................... 700/118
2008/0269933 A1* 10/2008 Barbir ............................ 700/98
2009/0189524 A1* 7/2009 Harada ......................... 313/582

FOREIGN PATENT DOCUMENTS

FR 2 888 966 A1 1/2007
WO 2004/026546 A1 4/2004

* cited by examiner

*Primary Examiner* — Mohammad Ali
*Assistant Examiner* — Anthony Whittington
(74) *Attorney, Agent, or Firm* — Ladas & Parry LLP

(57) ABSTRACT

The invention provides a method of controlling a machine for cutting out masks for protecting vehicle portions, which comprises the following operations:

displaying on a display unit, the marques, models, and versions of vehicles for each of which the outlines of masks for protecting a plurality of bodywork parts are stored in a database;

detecting a vehicle selection and displaying on the display unit a plurality of distinct representations of the vehicle corresponding to the vehicle, each representation including regions corresponding to protective masks stored in the database;

detecting a mask selection and modifying the appearance of at least one region of the displayed representations as a function of said mask selection;

detecting mask selection validation and storing the most recently selected mask in a list of masks for cutting out, and for each mask in the list of masks for cutting out, sending data for controlling the cutting out of the masks in question to a mask-cutter machine.

11 Claims, 7 Drawing Sheets

FIG. 3

| Vind | Vmar | Vmod | Vver | CONT_P_rep1 | CONT_P_rep2 | CONT_P_rep3 | MASQind |
|---|---|---|---|---|---|---|---|
| V1 | MAR1 | MOD1 | VER1 | Cont_p1_rep1 | Cont_p1_rep2 | Cont_p1_rep3 | Masq1 |
| V1 | MAR1 | MOD1 | VER1 | Cont_p2_rep1 | Cont_p2_rep2 | Cont_p2_rep3 | Masq2 |
| V1 | MAR1 | MOD1 | VER1 | Cont_p3_rep1 | Cont_p3_rep2 | Cont_p3_rep3 | Masq3 |
| V1 | MAR1 | MOD1 | VER1 | Cont_p4_rep1 | Cont_p4_rep2 | Cont_p4_rep3 | Masq4 |
| V1 | MAR1 | MOD1 | VER1 | Cont_p5_rep1 | Cont_p5_rep2 | Cont_p5_rep3 | Masq5 |
| V2 | MAR1 | MOD1 | VER2 | Cont_p1_rep1 | Cont_p1_rep2 | Cont_p1_rep3 | Masq6 |
| V2 | MAR1 | MOD1 | VER2 | Cont_p2_rep1 | Cont_p2_rep2 | Cont_p2_rep3 | Masq7 |
| V2 | MAR1 | MOD1 | VER2 | Cont_p3_rep1 | Cont_p3_rep2 | Cont_p3_rep3 | Masq8 |
| V2 | MAR1 | MOD1 | VER2 | Cont_p4_rep1 | Cont_p4_rep2 | Cont_p4_rep3 | Masq9 |
| V2 | MAR1 | MOD1 | VER2 | Cont_p5_rep1 | Cont_p5_rep2 | Cont_p5_rep3 | Masq10 |
| V2 | MAR1 | MOD1 | VER2 | Cont_p6_rep1 | Cont_p6_rep2 | Cont_p6_rep3 | Masq11 |
| V2 | MAR1 | MOD1 | VER2 | Cont_p7_rep1 | Cont_p7_rep2 | Cont_p7_rep3 | Masq12 |
| V2 | MAR1 | MOD1 | VER2 | Cont_p8_rep1 | Cont_p8_rep2 | Cont_p8_rep3 | Masq13 |
| V2 | MAR1 | MOD1 | VER2 | Cont_p9_rep1 | Cont_p9_rep2 | Cont_p9_rep3 | Masq14 |
| V2 | MAR1 | MOD1 | VER2 | Cont_p10_rep1 | Cont_p10_rep2 | Cont_p10_rep3 | Masq15 |
| V2 | MAR1 | MOD1 | VER2 | Cont_p11_rep1 | Cont_p11_rep2 | Cont_p11_rep3 | Masq16 |
| ....... | ....... | ....... | ....... | ....... | ....... | ....... | ....... |

SYSTEM AND A METHOD OF FABRICATING PROTECTIVE MASKS FOR VEHICLES

TECHNICAL FIELD

The present invention relates to systems and methods for fabricating protecting masks for protecting at least a portion of a vehicle against the soiling that is likely to result from painting at least one other portion of the vehicle.

The technical field of the invention is that of repairing motor vehicle bodywork.

STATE OF THE ART

It is known to protect certain portions of a motor vehicle prior to painting at least one portion of its bodywork, the protection being provided by masks that cover the portions that are to be protected.

For this masking operation, it is possible to use salvaged paper or paper packaged in roll form. For each portion of the vehicle that is to be protected, an operator can manually cut out, tear, and/or crumple a sheet of paper to make a mask blank. Those operations are lengthy and difficult, and they never give rise to a mask of a shape that matches that of the part(s) to he protected.

Application WO 02/29767 describes a mask for protecting a glazed or a rounded portion of a vehicle, the mask being made of a sheet material of outline that is curvilinear, at least in part. The sheet material may be greaseproof paper or Kraft paper coated on both faces, and may present thickness lying in the range 20 micrometers (μm) to 80 μm and may present weight per unit area lying in the range 20 grams per square meter ($g/m^2$) to 80 $g/m^2$.

Application WO 2004/026546 describes a mask-cutter system having a three-dimensional geometrical database of glazed portions of vehicles, a program for computing a flattened warped outline suitable for constituting a two-dimensional geometrical database of approximate outlines for masks on the basis of the three-dimensional geometrical data. A computer connected to the databases and to a cutter machine fitted with a movable cutter tool controls the movement of the blade of the cutter tool so as to cut a mask out from sheet material around a plane (two-dimensional) outline that is adapted to the vehicle portion for masking. A device for putting visible marques on one of the faces of the masks is also provided.

The construction of a three-dimensional geometrical database of outside portions or surfaces of a vehicle that might need to be covered by a mask presents difficulties, even when said surfaces are measured and digitized using a scale model of a vehicle, as described in patent FR 2 888 966.

SUMMARY OF THE INVENTION

An object of the invention is to provide a system and a method for fabricating articles for covering an outside portion, generally a non-plane portion, of a vehicle, which system and method are improved or remedy, at least in part, the drawbacks or shortcomings of such systems and methods.

An object of the invention is to provide a system and a method for cutting out masks for protecting a vehicle portion, and enabling an operator to select simply and quickly one or more masks for cutting out.

An object of the invention is to provide a system and a method for cutting out masks for protecting a vehicle portion that make it easier to put such mask(s) into place on the vehicle for painting.

In particular, the invention provides a system for cutting out masks for protecting at least one vehicle portion, the system comprising:

- a mask-cutter machine for cutting masks out from sheet material packaged in the form of a roll, the machine including a movable tool for cutting the sheet material;
- a data processor unit connected to the cutter machine and arranged to control relative movement between the cutter tool and the sheet material;
- a (first) database of mask outlines (two-dimensional shapes), the database being associated with (connected to or incorporated in) the data processor unit; and
- a display unit and a data input unit that are coupled to the data processor unit.

According to an aspect of the invention, the mask-cutter system further comprises:

- a (second) (graphics) database containing, for a plurality of vehicles, a plurality of representations of each vehicle from a plurality of distinct viewing angles, said second database being associated with (connected to or incorporated in) the data processor unit; and a display unit control unit that is coupled to, in particular incorporated in, the data processor unit and that is arranged, in particular programmed:
  - to extract from the second database the representations from a plurality of viewing angles of a vehicle selected by an operator as a function of at least one vehicle selection input into the data processor unit via the data input unit;
  - to modify the representations from a plurality of distinct viewing angles of the selected vehicle as a function of at least one mask selection input by an operator into the data processor unit via the data input unit; and
  - to cause modified representations of the selected vehicle to be displayed substantially simultaneously on the display unit.

The invention enables an operator to select easily and quickly, and without risk of error, at least one mask for cutting out selected from a plurality of masks of outlines that are contained in the mask outline database, by acting on the data input unit.

Preferably, the display unit and the data input unit are made in the form of a touch screen connected to the data processor unit.

Under such circumstances, in particular, a mask selection data may be input by exerting pressure on (or by touching) a portion of the display unit on which a portion of one of the displayed representations is being displayed.

The touch-screen interface and/or the data processor unit may then be programmed, on detecting pressure or contact on a portion of the display unit corresponding to a portion of one of the displayed representations, to determine which one of the masks (of outline stored in the first database) is adapted to mask the vehicle portion corresponding to said displayed representation portion.

In particular, the touch-screen interface and/or the data processor unit may be programmed, on detecting pressure or contact on a portion of the display unit corresponding to a portion of one of the displayed representations, to add to, or the contrary to remove from, a list of masks for cutting out, that one of the masks that is adapted to mask the vehicle portion corresponding to said displayed representation portion, and to modify the appearance, e.g. the color, of said displayed representation portion and also, where appropriate, the appearance of portions of other representations that are displayed simultaneously and that correspond to the masks as selected or deselected in this way.

In an embodiment, the vehicle representations that are displayed simultaneously are at different (reduced) scales. In particular, one of the representations, referred to as the main representation, may be displayed at a first scale, together with a plurality of other representations, referred to as secondary representations, that may be displayed at a second scale smaller than the first scale.

Under such circumstances, in particular, the data input and the display unit control unit may be programmed, on detecting pressure or contact exerted on a portion of the display unit having one of the secondary representations displayed therein, to replace the main representation by the secondary representation as selected in this way, and to increase its scale, so as to make it easier (for the operator) then to select/deselect a mask that is not visible or that is poorly visible in the previously-displayed main representation.

The contents of the first and second databases may be grouped together in a single database.

In another aspect of the invention, there is provided a method of controlling a machine for cutting out masks for protecting a vehicle portion, the method comprising the following operations:

- displaying on a display unit, the marques, models, and versions of vehicles for each of which the outlines of masks for protecting a plurality of bodywork parts are stored in a database;
- detecting a vehicle selection data and displaying on the display unit a plurality of distinct representations of the vehicle corresponding to the vehicle selection data, each representation including regions corresponding to protective masks that might be selected;
- detecting a mask selection data and modifying the appearance of regions of the displayed representations as a function of said mask selection data;
- detecting mask selection validation and storing the most recently selected mask in a list of masks for cutting out; and
- for each mask in the list of masks for cutting out, sending data or signals for controlling the cutting out of the masks in question to a mask-cutter machine.

In an embodiment, the system and the method may be arranged to modify the appearance of a plurality of regions of at least one of the displayed representations is modified as a function of a single selection of a group of masks for a selected vehicle.

Preferably, the content(s) of the database(s) is/are previously encrypted so that the data extracted from the database(s) is decrypted prior to being used.

In another aspect there is provided a data medium including instructions that are readable and executable by a computer to implement a method of the invention.

Other aspects, characteristics, and advantages of the invention appear from the following description which refers to the accompanying figures and shows preferred embodiments of the invention without any limiting character.

BRIEF DESCRIPTION OF THE FIGURES

FIG. 3 is a table diagrammatically listing the contents of a database of a mask-cutter system in an embodiment.

Unless stated implicitly or explicitly to the contrary, elements that are structurally or functionally identical or similar are designed by identical references in the various figures.

DETAILED DESCRIPTION OF THE INVENTION

Figure 1:
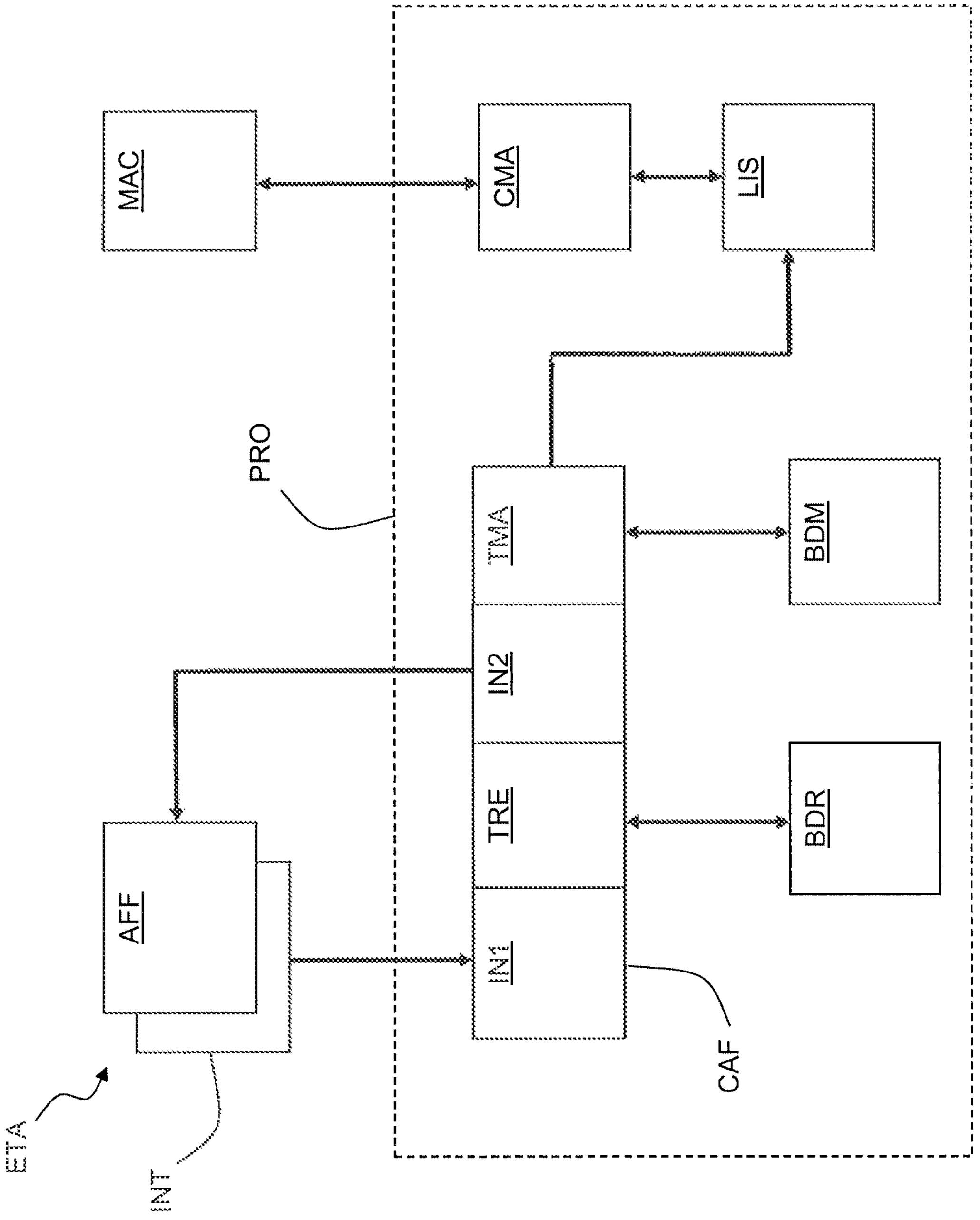
FIG. 1 is a diagram showing the main components and their interconnections, of a mask-cutter system in an embodiment.

With reference to FIG. 1 in particular, the mask-cutter system comprises a data processor PRO connected to a mask-cutter machine MAC for cutting masks out from a sheet material packaged in roll form.

The machine MAC comprises a stationary structure together with a cutter tool and a marking/writing tool that are supported by the stationary structure and driven to move by actuators of the machine.

For this purpose, the actuators receive control signals for moving the tools, which signals are applied thereto by a control module CMA incorporated in the processor unit PRO.

The cutter and marking tools may be movable relative to the stationary structure along at least a horizontal axis and a vertical axis, as described in documents WO 2004/026546 and FR 2 888 966.

The data processor unit PRO is also connected to a touch screen ETA incorporating a display unit AFF and a data input unit INT for inputting data by pressing against or making contact with a transparent touch-sensitive surface covering the display unit.

The data processor unit PRO contains a database BDR containing data defining the outlines of regions or zones of representations of vehicles seen from various viewpoints, and also a database BDM containing data defining outlines for masks designed to cover respectively vehicle portions corresponding to said regions or zones of representations of vehicles.

The database BDR may have the structure shown diagrammatically in FIG. 3, in the form of a table in which the first row has labels for the fields of the database and in which the following rows contain records of the database for two vehicles referenced V1 and V2 in the first field Vind for identifying a vehicle.

The second field Vmar contains the marque of the vehicle "MAR1" in this example; the third field Vmod contains the model of the vehicle, "MOD1" in this example; and the fourth field Vver contains the version of the vehicle, respectively "VER1" and "VER2", in this example.

For each representation of each vehicle, the database BDR includes a map of the various bodywork parts and glazed parts of the vehicle: each representation comprises an outline within which lines or boundaries separate a plurality of zones or regions corresponding respectively to distinct parts of the vehicle. Each zone or region of the representation is associated with a mask in the database BDM that is designed to mask said zone or region, or with a pointer or index MASQind pointing to said mask, and contained in the eighth field (eighth column) of the structure shown in FIG. 3, This figure corresponds to the situation in which the database BDR contains outline data for parts/regions from three distinct viewpoints, which data is recorded in the fifth, sixth, and seventh fields (CONT_P _rep1, CONT_P_rep2, and CONT_P_rep3) of the database.

In this example, the database BDR contains the outlines of five parts p1 to p5 in each of three representations, for the vehicle V1, and i.e. contains the outlines of eleven parts p1 to p11 in each of three representations, for the vehicle V2.

For each mask such as the mask identified by the index Masq6 in the eighth field, the database BDR contains geometrical data defining the image of the part to be masked by the mask, and defining the corresponding region of the representation, in each of the three representations.

When these views/representations correspond to plane projections, as shown in FIGS. 4 to 7, the outline of each region corresponds to the projection of the surface of the part onto the projection plane under consideration, while the outline of the mask corresponds approximately to the part as developed (spread out flat).

In FIGS. 4 to 7, it can be seen that five representations of a selected vehicle are shown simultaneously on the screen ETA: a representation REP1 of the vehicle seen from behind, a representation REP2 of the vehicle seen from in front, a representation REP3 of the vehicle seen from the left side, and a representation REP4 of the vehicle seen from the right side.

These four representations (REP1 to REP4) on a small scale, referred to as secondary representations, occupy a small zone of the screen, while the fifth representation REP5 occupies a major portion of the display zone.

The fifth representation REP5, on a large scale, is a representation of that one of the four representations REP1 to REP4 that has (temporarily) been selected by an operator in order to select one or more masks for cutting out.

With reference to FIG. 1, the unit PRO includes a display control unit CAF that has four data processing modules:

- a first data processing module IN1 connected to the input unit INT serves as a read interface for reading the selection data input by an operator via the data input unit INT;
- a second data processing module TRE connected to the module IN1 and to the database BDR serves to extract data from the database BDR as a function of the selection data delivered by the module IN1, and to treat the extracted data;
- a third data processing module IN2 connected to the module TRE serves as an interface for transmitting vehicle representation data for display by the unit AFF, which data is transmitted via the treatment unit TRE; and
- a fourth data processing module TMA connected to the module IN2 and to the database BDM serves to extract data from the database BDM as a function of mask selection data transmitted by the modules IN1, TRE, and IN2, and for treating the data extracted from the database DBM.

The modules IN1, TRE, and IN2 of the display control unit CAF are programmed:

- to extract from the database BDR the representations REP1 to REP5 seen from various viewing angles of a selected vehicle V, as a function of at least one vehicle selection input by an operator into the processor unit PRO via the data input unit INT;
- to modify the representations from various distinct viewing angles of the selected vehicle as a function of at least one mask selection input by an operator into the data processor unit, via the data input unit; and
- to cause modified representations of the selected vehicle to be displayed substantially simultaneously on the display unit AFF.

Figure 2:
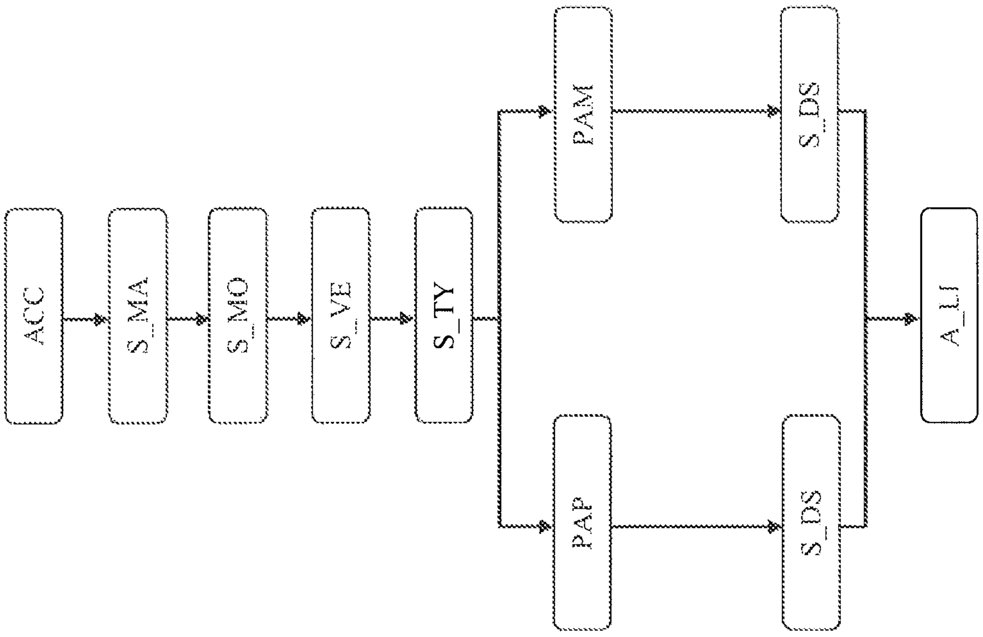
FIG. 2 is a diagram showing the main steps of a method of selecting masks for cutting out, in an implementation.

With reference to FIGS. 1 and 2 in particular, the method of controlling the machine MAC by the unit PRO comprises the following operations:

Starting from a home page ACC, the unit PRO causes the display unit AFF to display in succession the marques, the models, the versions, and the types of vehicle for each of which protection mask outlines are recorded for a plurality of bodywork parts in the database BDM.

At each of these selection steps, referenced S_MA, S_MO, S_VE, and S_TY, the unit PRO detects and stores the corresponding selection data input by an operator into the unit INT.

Thereafter, the unit PRO compares this data with the data in the database BDR and extracts from the database all of the parts of the vehicle as selected in this way by the operator and causes the various representations and their respective subdivisions into regions to be displayed for the selected vehicle; each representation thus includes the regions corresponding to portions of the vehicle that might need masking and to the protective masks that might be selected.

On detecting pressure or contact on a portion of the display unit corresponding to a portion of the main representation REP5, the unit CAF and/or the data processor unit PRO is/are programmed to determine a mask adapted to mask the vehicle portion corresponding to said portion of the displayed representation.

Thus, when the control unit CAF for displaying representations detects a mask selection input by the operator, the selection is applied as input to the representation treatment module TRE, which module modifies the appearance of regions of the displayed representations as a function of said mask selection, and the interface IN2 causes the display of the representations that include these regions to take on a modified appearance.

Figure 4:
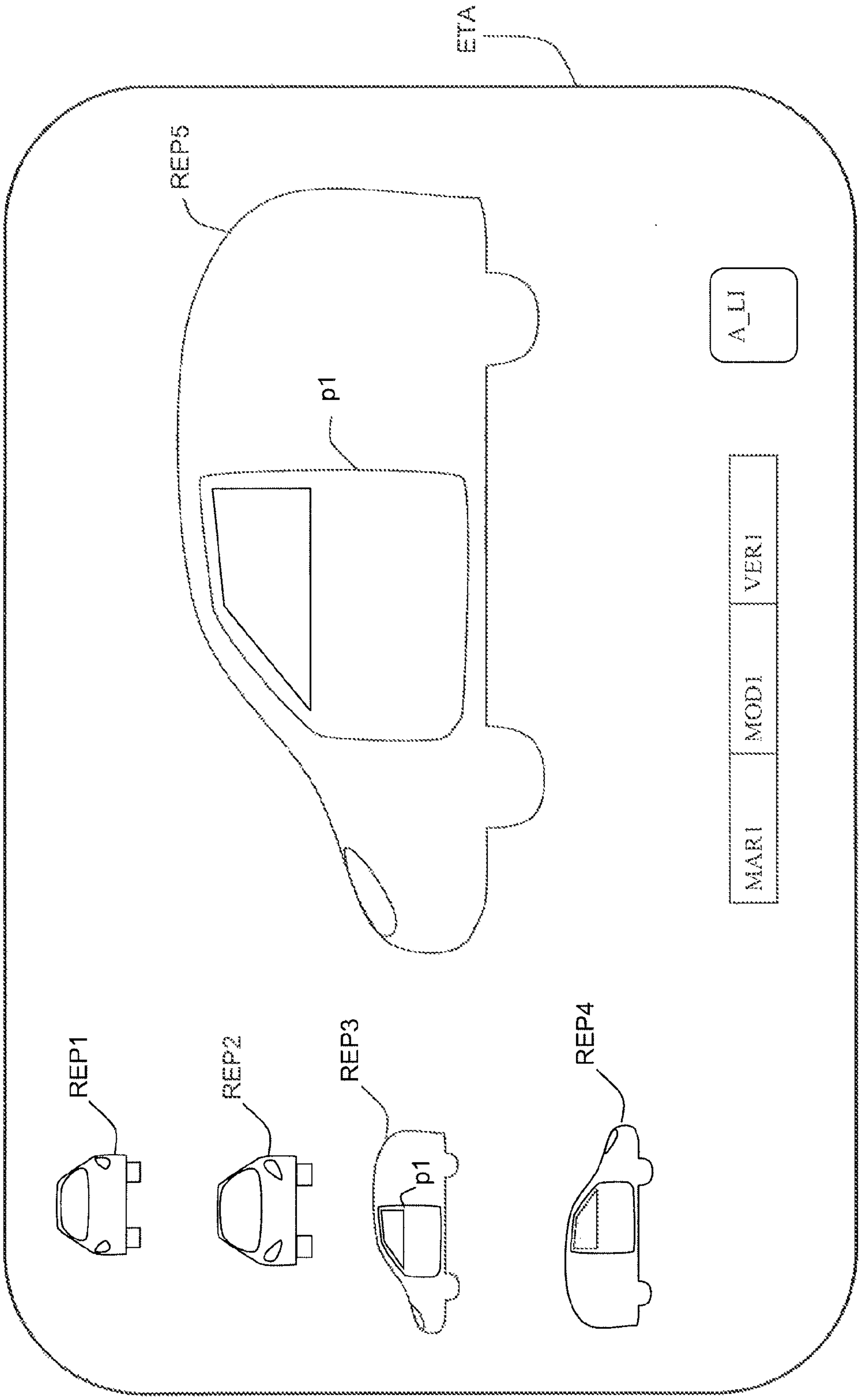
FIGS. 4 to 7 show different configurations of a selection and control interface of a mask-cutter system in an embodiment.
Figure 5:
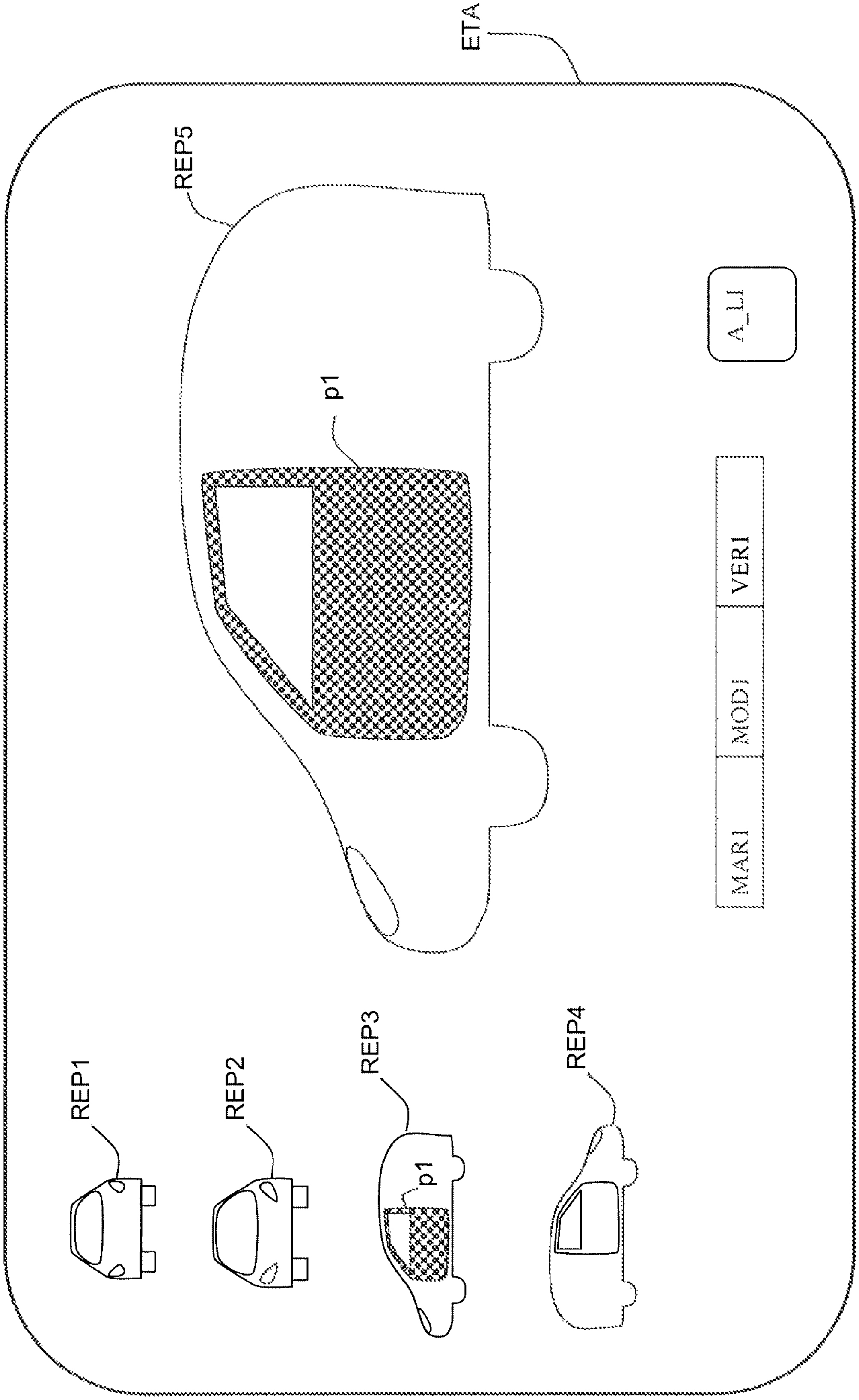

For each region under consideration in the main representation REP5, on first detection of pressure or contact on a portion of the display unit corresponding to the region under consideration in the main representation REP5, for example the region corresponding to the left door pl in FIG. 4, the module TMA of the unit CAF adds to a provisional list of masks for cutting out, that one of the masks that is adapted to mask the portion of the vehicle that corresponds to the region in question, and the modules TRE and IN2 of the unit CAF modify the appearance of the portion of the representation REPS that corresponds to said region, and also modify, where appropriate, the appearance of portions of the other representations that are displayed simultaneously and that correspond to said region selected in this way: in the example shown in FIGS. 4 and 5, the appearance of the region corresponding to the left door pl is modified in the representations REP3 and REP5 only, since this part is not visible in the other three representations REP1, REP2, and REP4.

Conversely, on second detection of pressure or contact on a portion of the display unit corresponding to the same region, the module TMA removes from the provisional list of masks for cutting out, that one of the masks that is adapted to mask the portion of the vehicle that corresponds to said region, and the modules TRE, IN2 of the unit CAF modify the appearance of the portion of the representation REP5 that corresponds to said region, and also, where appropriate, the appearance of the portions of the other representations that are displayed simultaneously and that correspond to said region as deselected in this way.

On detecting a pressure or a contact exerted on a portion of the display unit that is displaying one of the secondary representations REP1 to REP4, the data input unit and the display unit control unit are also programmed to replace the main representation by the secondary representation as selected in this way and to increase its scale, so as to facilitate subsequent selection or deselection of a mask.

Figure 6:
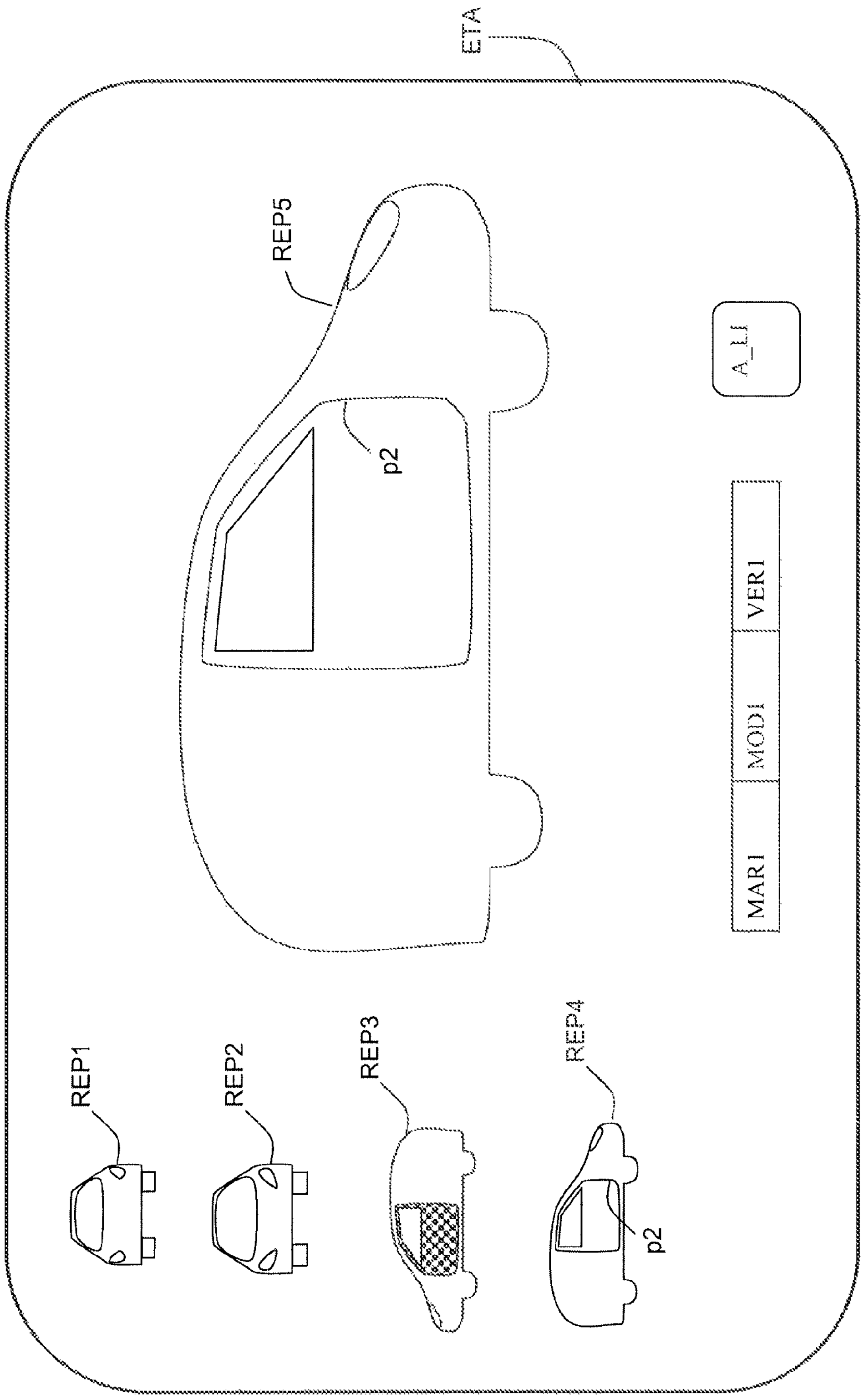

In the example shown in FIGS. 5 and 6, pressure exerted on the secondary representation REP4 of FIG. 5 has caused this representation (right-hand side of the vehicle) to be displayed so as to form the main representation REP5 shown in FIG. 6.

In this display configuration, an operator can easily select the masks that correspond to those regions of the vehicle that are essentially visible in this representation, by pointing to any desired region.

These operations (referenced S_DS in FIG. 2) of selecting and deselecting masks by pointing to corresponding regions of the main representation REP5 may be repeated until all of the masks that it is desired to cut out for the vehicle under consideration have been selected, with all of the selected masks being distinctly visible in the various representations REP1 to REP5.

The way in which masks are selected by pointing to regions corresponding to the parts that are to be masked is shown by the right-hand branch in the diagram of FIG. 2, the branch containing the label PAM.

A second mode of selecting masks may be obtained by pointing to the regions that correspond to the parts for painting, as illustrated by the left-hand branch in the diagram of FIG. 2, containing the label PAP.

In this second selection mode, on detecting pressure or contact on a portion of the display unit corresponding to a portion of the main representation REP5, the unit CAF and/or the data processor unit PRO is/are programmed to determine one, and generally more, mask(s) adapted to mask the, or each, portion of the vehicle that surrounds and/or borders said portion of the displayed representation.

Figure 7:
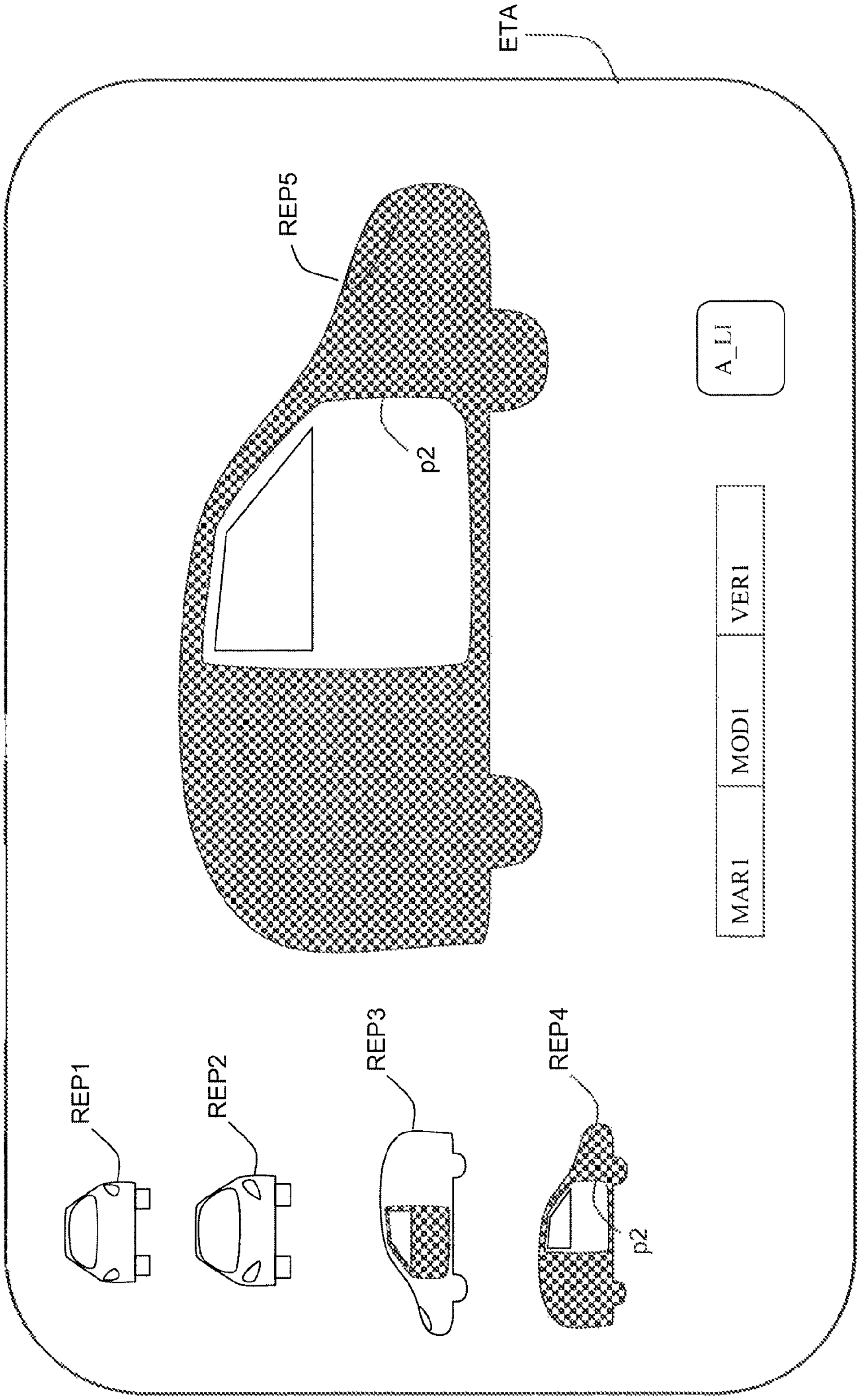

With this mode of selection, in the example shown in FIGS. 6 and 7, pointing to the region of the representation REP5 that corresponds to the right door p2, when detected by the interface IN1, causes masks for the parts surrounding said door to be added to the provisional list of masks for cutting out, and also causes the corresponding modification to be displayed in the representations REP4 and REP5, as shown in FIG. 7, When all of the desired masks have been selected in this way, the operator can validate the selection by pointing on a zone A_LI of the device INT and visible on the screen ETA.

On detecting this validation of mask selection via the interface IN1, the most recently selected masks are stored in a list LIS of masks for cutting out (procedure referenced A_LI in FIG. 2).

Before storing these masks, the module TMA may be programmed to merge a plurality of masks for protecting adjacent parts, thereby making it possible to reduce the length of time required for putting the masks into place on the vehicle that is to be painted.

For each mask in the list LIS of masks for cutting out, data or signals for controlling the cutting of the mask in question is/are transmitted to the machine MAC by the database CMA (FIG. 1).

In FIGS. 4 to 7, it can be seen that the information MAR1, MOD1, and VER1 identifying the vehicle is displayed on the screen ETA. Preferably, such identification data is also transmitted to the machine MAC that causes it to be written on the masks in question while they are being cut out, so as to make it easier for an operator to recognize the destination of each mask that has been cut out.

What is claimed is:

1. A system for cutting out masks for protecting a vehicle portion, the system comprising:

a mask-cutter machine for cutting masks out from sheet material, the machine including a movable tool for cutting the sheet material;

a data processor unit connected to the cutter machine and arranged to control relative movement between the cutter tool and the sheet material;

a first database of mask outlines, the first database being associated with the data processor unit;

a display unit and a data input unit coupled to the data processor unit;

a second database containing, for a plurality of vehicles, a plurality of representations of each vehicle from a plurality of distinct viewing angles, said second database being associated with the data processor unit; and a display unit control unit that is coupled to, in particular incorporated in, the data processor unit and that is arranged, in particular programmed:

to extract from the second database the representations from a plurality of viewing angles of a vehicle as a function of at least one vehicle selection data input into the data processor unit via the data input unit;

to modify the representations from a plurality of distinct viewing angles of the selected vehicle as a function of at least one mask selection data input into the data processor unit via the data input unit; and to cause modified representations of the selected vehicle to be displayed substantially simultaneously on the display unit.

2. A system according to claim 1, wherein the display unit and the data input unit are made in the form of a touch screen connected to the data processor unit.

3. A system according to claim 1, wherein the touch-screen interface and/or the data processor unit is/are programmed, on detecting pressure or contact on a portion of the display unit corresponding to a portion of one of the displayed representations, to determine a mask that is adapted to mask the vehicle portion corresponding to said displayed representation portion.

4. A system according to claim 1, wherein the touch-screen interface and/or the data processor unit is/are programmed, on detecting pressure or contact on a portion of the display unit corresponding to a portion of one of the displayed representations, to add to, or the contrary to remove from, a list of masks for cutting out, that one of the masks that is adapted to mask the vehicle portion corresponding to said displayed representation portion, and to modify the appearance of said displayed representation portion and also, where appropriate, the appearance of portions of other representations that are displayed simultaneously and that correspond to the masks as selected or deselected in this way.

5. A system according to claim 1, wherein the simultaneously displayed vehicle representations are at different scales, a main representation being displayed at a first scale, and a plurality of secondary representations being displayed at a second scale smaller than the first scale.

6. A system according to claim 5, wherein the data input and the display unit control unit are programmed, on detecting pressure or contact exerted on a portion of the display unit having one of the secondary representations displayed therein, to replace the main representation by the secondary representation as selected in this way, and to increased its scale.

7. A system according to claim 1, wherein the second database includes, for each representation of each vehicle, a map of different bodywork parts and glazed parts of the vehicle.

8. A system according to claim 7, wherein each representation includes an outline within which a plurality of zones or regions corresponding respectively to distinct parts of the vehicle are separated by lines or boundaries, with each zone or region of the representation being associated with a mask of the first database that is designed to mask said zone or region, or with an index pointing to said mask.

9. A system according to claim 1, wherein the display unit control unit is incorporated in the data processor unit.

10. A system according to claim 1, arranged to merge a plurality of protective masks for adjacent parts of a vehicle.

11. A system according to claim 1, arranged to transmit to said mask-cutter machine vehicle identification data so as to cause said data to be written on a mask being cut out.

* * * * *